Jan. 17, 1961   D. J. SIKORRA   2,968,805
ELECTRICALLY OPERATED INDICATING DEVICES
Filed Aug. 1, 1955
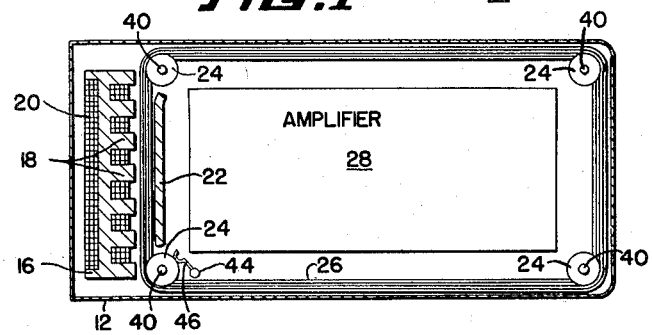
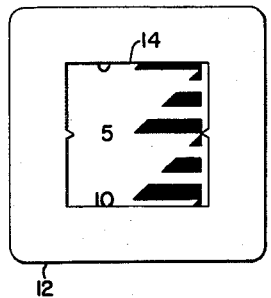
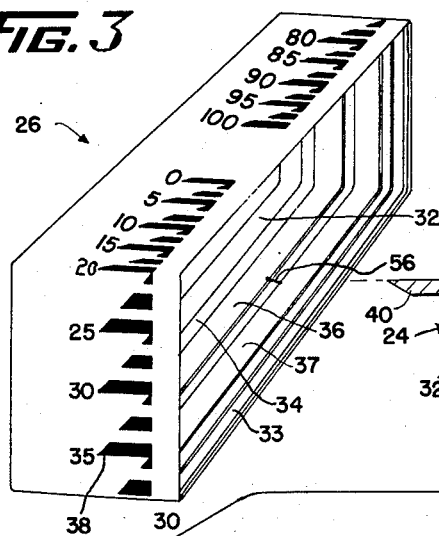
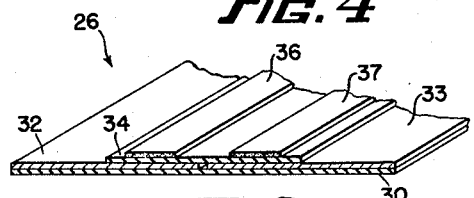
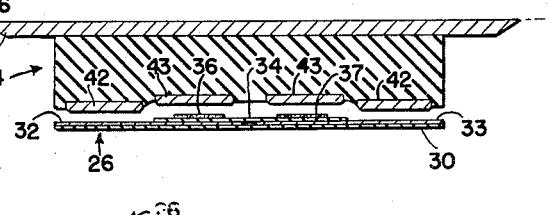
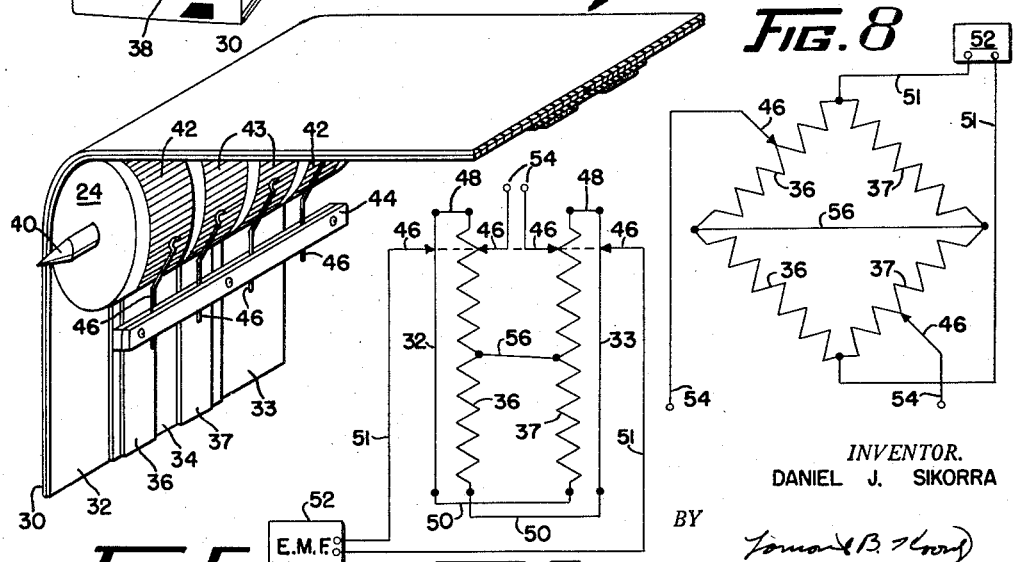
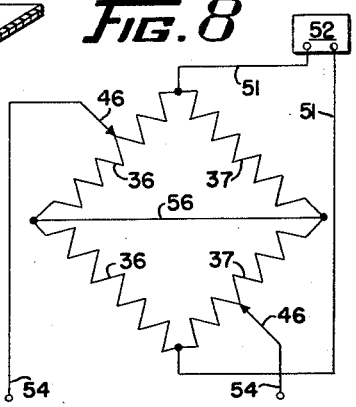
INVENTOR.
DANIEL J. SIKORRA
BY
ATTORNEY United States Patent Office 2,968,805
Patented Jan. 17, 1961

2,968,805

ELECTRICALLY OPERATED INDICATING DEVICES

Daniel J. Sikorra, Champlin, Minn., assignor to Minneapolis-Honeywell Regulator Company, Minneapolis, Minn., a corporation of Delaware Filed Aug. 1, 1955, Ser. No. 525,512

6 Claims. (Cl. 340—316)

This invention pertains to an indicator comprising magnetic means which, when energized, develops a moving magnetic flux which cooperates with a flexible tape having a suitable indicia thereon and comprising in part a metallic foil portion or portions to set up eddy currents in the tape. The eddy currents circulating in the metallic portion or portions of the tape in turn develop magnetic fluxes which react with the main flux developed by the magnetic means and impart a force to the tape for moving it with respect to the magnetic means. The invention further provides novel means for positioning the tape with respect to the magnetic means and additional means for providing closed loop action when the device is used in a servo system. To provide this last named feature a resistive track or tracks is placed on the tape and insulated from the metallic portion and wiper or brush means are provided which are connected through appropriate connection means to the resistive track or tracks and the metallic portion or portions so that the position of the tape as sensed by the wiper means connected with the resistive track or tracks gives a positional reference of the tape that may be used for feedback purposes.

A broad object of this invention is to provide an improved indicating device.

Another object of the invention is to provide an indicator which has an unusually long scale which provides accuracy of indication without resort to a vernier dial.

Another object of this invention is to provide an electrically operated indicating device which is very compact and which has low inertia and therefore fast response.

A further object of the invention is to provide an indicator having a flexible conductive tape disposed in a moving magnetic field.

Still a further object of the invention is to provide an indicator having a flexible conductive tape with a resistive portion thereon so as to provide closed loop operation.

These and other objects of the invention including constructional details and the operation of indicators embodying my invention, will be set out more fully in and become apparent from a reading of the following specification and appended claims, in conjunction with the accompanying drawing in which:

Figure 1 is a cross sectional view of an indicator embodying my invention;

Figure 2 is a right end view of the device shown in Figure 1;

Figure 3 is an isometric view of the tape unit used in the improved indicator;

Figure 4 is a cross sectional isometric view of the tape;

Figure 5 is an isometric view of the tape unit coacting with a roller and brush unit;

Figure 6 is a cross sectional view of the tape unit and half of a roller the tape and roller being shown spaced apart for clarity.

Figure 7 is a schematic diagram of the tape circuit showing in part the inner connections between the conductive portions and the resistive portions; and Figure 8 is an equivalent circuit of the device.

Referring to Figure 1, numeral 10 denotes an improved indicator embodying the teaching of my invention and comprises a main support or frame 12 which has a rectangular box-like construction and the right end of which, as shown in Figure 2, has a window-like aperture 14 therein which may be used for viewing purposes. Means not shown are used to position the indicator upon the control panel of an aircraft for instance.

Magnetic means in the form of a magnetic core structure or magnetic thruster 16 is mounted by means not shown within support 12 at the left end thereof as shown in Figure 1. Core structure 16 has a plurality of poles 18 extending inwardly and suitable winding means 20 are placed upon core structure 16 which when energized will develop a moving magnetic flux along the longitudinal extent of the core structure. The winding means 20 may be suitable coils wound about core structure 16 and selectively energized from a variable potential two-phase alternating current source. For examples of types of structures which could be used as means for producing a moving magnetic field, reference may be made to the patents to E.B. Hoff, 1,480,553, and to W. A. Stone, 2,564,772. It will be appreciated, however, that the invention is not limited to the illustrated type of core structure or method of energization, but is to be construed to encompass all means for producing a moving magnetic field.

A magnetic return plate 22 is mounted on the support 12 by means not shown adjacent to but spaced from the poles 18 of the core structure 16. Thus an air gap is defined between the magnetic return plate 22 and the faces of the poles 18. A plurality of roller members 24 are supported by suitable bearing means, not shown, on the support 12. Rollers 24 provide a means of movably supporting the flexible tape to be described in further detail below and are positioned one adjacent to each end of the core structure 16 and one adjacent to the inside of the top and the bottom of the window 14 in the end of support 12. An amplifier 28 is supported by means not shown on the support 12 and is positioned within the space defined by the tape 26.

Referring now to Figure 4 it is seen that the tape 26 comprises an insulative base portion 30 which may be made out of any suitable dielectric material such as "Mylar." Fastened to the insulative base 30 by suitable adhesive means, not shown, are two continuous bands of metallic foil such as cooper or aluminium 32 and 33. Foils 32 and 33 may be of any suitable thickness in order to obtain the desired results. A typical thickness for foils 32 and 33 is 0.001 inch. An insulative member 34 which also may be "Mylar" abuts the opposite sides of foils 32 from the insulative strip 30 and is of less width than the strip 30 so as to leave portions of the foils 32 exposed. A pair of resistive track members 36 and 37 which may be of the resistance film type are deposited on the insulative member 34.

Referring to Figure 1 it will be noted that tape 26 is disposed to lie between the magnetic core structure 16 and the magnetic return plate 22. A suitable scale marking 38 is placed on the outside of the insulative base member 30 as shown in Figure 3 so that the relative position of tape 26 with respect to window 14 of the support 12 is presented to the observer.

Each of the rollers 24 which may be made out of an insulative material such as hard rubber has an axle member 40 adapted to be supported by the bearings, not shown, on the main frame or support 12. As is clearly shown in Figure 6 each of the rollers 24 has a plurality of conductive bands 42 and 43 mounted on the periphery thereof, the two inner-bands 43 being of a smaller diameter than the two outer bands 42 so as to compensate for the thickness of the insulative member 34 and the resistive tracks 36 on the tape member 26.

A brush holder 44 supported by base 12 by means not shown holds a plurality of brushes 46 which are adapted to bear against the conductive bands 42 and 43 of rollers 24.

In the preferred embodiment of the invention, the tape 26 is kept under constant tension by use of suitable spring means acting on the rollers 24. The spring means are not shown but may be portions of the frame 12 itself or other suitable means. The tape 26, under constant tension, is thus caused to snugly engage the rollers 24 with the two conductive bands 42 contacting the foils 32 and 33 and with the two conductive bands 43 contacting the resistive strips 36 and 37. The wipers 46 also being in contact with the conductive bands 42 and 43 on the rollers 24 are thus in effect in contact with the foils 32 and 33 as well as the resistive tracks 36 and 37. Certain inner-connections are made between the resistive portions and conductive portions of the tape. Referring to Figure 7 it will be seen that the resistive strips 36 and 37 are connected at opposite ends to the conductive foils 32 and 33. Thus similar ends of the two resistive tracks 36 and 37 are connected by suitable connections 48 to the foils 32 and 33 respectively and the opposite ends of the resistive tracks 36 and 37 are connected respectively to the foils 33 and 32 by suitable connections 50. The two brushes 46 bearing against the foils 32 and 33 may be connected by leads 51 to a suitable source of electromotive force 52 and the other brushes 46 are connected by suitable leads 54 to control apparatus, not shown, to carry the position feedback signal. A cross connector 56 is connected to the resistive tracks 36 and 37 at the point corresponding to 50% of the tape travel between the extremities of the tracks 36 and 37 and is an optional feature. Cross connector 56 connects two points of equal potential and thus provides a stabilizing effect on the circuit. It will be appreciated that in operation the brushes 46 remain stationary and the resistive tracks 36 and 37 and the foils 32 and 33 move with respect to the brushes.

In Figure 8 an equivalent track schematic is shown. The resistive tracks 36 and 37 connected at their mid points by the cross connector 56 and their ends by the foils 32 and 33 and connections 48 and 50 takes the form of a conventional bridge one set of opposite corners being connected to the source of fixed excitation 52 and the wipers 46 picking off the positional feedback signal.

*Operation*

The movement of tape 26 is preferably controlled as in a simple rebalance control system. Thus amplifier 28, which controls the energization of the winding means 20 and hence the movement of tape 26, would receive a net signal from a network comprising a control signal producing means not shown operated by a condition responsive means not shown and a rebalance signal producing means. Under static conditions the rebalance signal would cancel out the control signal so that the net signal would be zero and the tape would be stationary with the scale marking 38 as viewed through window 14 indicating the value of the condition then present. If the condition changed then the control signal also would change and would no longer be cancelled out by the rebalance signal and a net signal would be applied to amplifier 28 which would drive tape 26 far enough in the proper direction so that the new rebalance signal developed by the rebalance signal producing means cancelled out the new control signal. The new position of the tape 26 as viewed through window 14 thus indicates the new value of the condition. No specific details of the complete control circuit have been shown with the exception of the rebalance signal producing means shown in Figures 7 and 8. Examples of rebalance control systems which could be used with the present invention are in the patents of H. Anschutz-Kaempfe, 1,586,233; Teeds, 2,031,050; Taylor, 2,028,110; and Gomborow, 786,024.

Thus, under static conditions the positional feedback signal from the indicator 10 would cancel out any signal from the control apparatus of which device 10 gives an indication of some quantity. However, should the control signal differ from the positional feedback signal, a net signal will be applied to amplifier 28 which in turn will energize the windings 20 on core structure 16 so as to set up a magnetic flux moving along core structure 16 in one direction or the other, depending upon the sense of unbalance. The moving flux traverses the air gaps between the faces on the magnetic poles 18 and the magnetic return plate 22 and thus links the foils 32 and 33 on the tape 26. This in turn sets up eddy currents in the foils 32 and 33 which set up counter fluxes which react with the primary flux and thus imparts a force to the tape 26 causing the latter to move with respect to the core structure 16, the tape moving in the same direction as the moving field. As the tape moves, the resistive tracks 36 and 37 being integral with the tape also move and cause the positional feedback signal to change in a sense so as to diminish the net signal fed into the amplifier 28. At a new position wherein the positional feedback signal cancels out the new control signal from the control apparatus, the net signal will be zero and the windings 20 will become de-energized so that the tape stops traveling and the tape will retain this position until a different control signal from the control apparatus is received. As viewed through window 14 of the frame 12 each change in control signal is reflected by a different position of the tape 26 and the scale marking 28 thereon and thus an indication of the magnitude of the controlled quantity is presented to the viewer.

I have shown and described a specific embodiment of this invention, but further modifications and improvements will occur to those skilled in the art. I desire it to be understood, therefore, that this invention is not limited to the particular form shown and I intend in the appended claims to cover all modifications which do not depart from the spirit and the scope of this invention.

What I claim is:

1. In indicating apparatus; a support; a magnetic thruster mounted on said support; means for energizing said thruster so that said thruster produces a moving magnetic field; magnetic return means positioned adjacent to said thruster; a flexible tape movably mounted on said support and with a portion thereof positioned between said thruster and said magnetic return means, said tape comprising an insulative base, an indicia on said base, a thin metallic foil on said base, an insulative member on said foil on the opposite side thereof from said base, and a resistive member on said insulative member; sliding contact means connected to said foil and said resistive material; means including said resistive member for controlling the energization of said thruster; and means for viewing said indicia.

2. In indicating apparatus; a support; a magnetic thruster mounted on said support and adapted when energized to produce a moving magnetic field; a magnetic return plate on said support adjacent to said thruster; a flexible endless tape movably mounted on rollers attached to said support and with a portion thereof positioned between said thruster and said return plate, said tape comprising an insulative base, an indicia on said base, a thin metallic foil on said base, an insulative member on said foil on the opposite side thereof from said base, and a resistive material on said member; sliding contact means connected to said foil and said resistive material; and means for viewing said indicia; energization of said thruster producing a moving magnetic field which coacts with said foil to impart motion to said flexible endless tape and indicia thereon.

3. In indicating apparatus; magnetic flux producing means adapted when energized to produce a moving magnetic field; magnetic return means positioned adjacent to said magnetic means; a flexible endless tape movably mounted with a portion thereof positioned between said magnetic means and said magnetic return means, said tape comprising an insulative base, an indicia on said base, a thin metallic foil on said base, an insulative member on said foil, and a resistive material on said member; sliding contact means connected to said foil and said resistive material; and means for viewing said indicia, energization of said magnetic flux producing means producing a moving magnetic field which coacts with said foil so as to impart motion to said flexible endless tape and the indicia thereon.

4. Apparatus of the class described: a support; magnetic flux producing means on said support and adapted when energized to produce a moving magnetic flux field; magnetic permeable means positioned adjacent to said flux producing means; a flexible electrically conductive strip member movably mounted on said support, being positioned in part between said flux producing means and said magnetic permeable means, and being constrained so as to be flexed at one portion of its extent as it is moved; resistive means on said flexible strip member and insulated therefrom; and means including said resistive means for controlling the energization of said flux producing means so as to produce a moving magnetic flux field to move said flexible strip member.

5. Apparatus of the class described: a support; magnetic flux producing means on said support and adapted when energized to produce a moving magnetic flux field; magnetic permeable means positioned adjacent to said flux producing means; a flexible electrically conductive strip member movably mounted on said support, being positioned in part between said flux producing means and said magnetic permeable means, and being constrained so as to be flexed at one portion of its extent as it is moved; feedback means on said flexible strip; and means including said feedback means for controlling the energization of said flux producing means so as to produce a moving magnetic flux field to move said flexible strip member.

6. In an indicating device, a support, a linear magnetic thruster mounted on said support, means for energizing said thruster so that said thruster produces a moving magnetic field, a magnetic return member positioned adjacent to said thruster, a flexible endless tape having an indicia thereon and comprising in part a flexible conductive strip movably mounted on said support and being positioned in part between said thruster and said plate, means including resistive means on said tape in circuit with said thruster for controlling the energization of said thruster, and means for viewing said indicia.

References Cited in the file of this patent

UNITED STATES PATENTS

| | | |
|---|---|---|
| 1,719,890 | Kinnard | July 9, 1929 |
| 1,959,771 | Smith | May 22, 1934 |
| 2,039,770 | Birdsell | May 5, 1936 |
| 2,074,066 | Wheeler | Mar. 16, 1937 |
| 2,338,423 | Geyer | Jan. 4, 1944 |